(12) United States Patent
Yavid et al.

(10) Patent No.: US 7,325,929 B2
(45) Date of Patent: Feb. 5, 2008

(54) METHOD AND APPARATUS FOR CONTROLLABLY MODULATING A LASER IN A LASER PROJECTION DISPLAY

(75) Inventors: Dmitriy Yavid, Stony Brook, NY (US); Paul Dvorkis, E. Setauket, NY (US); Ron Goldman, Cold Spring Harbor, NY (US); Joseph Katz, Stony Brook, NY (US); Narayan Nambudiri, Kings Park, NY (US); Miklos Stern, Woodmere, NY (US); Chinh Tan, Setauket, NY (US); Carl Wittenberg, Water Mill, NY (US); Frederick F. Wood, Medford, NY (US)

(73) Assignee: Symbol Technologies, Inc., Hontsville, NY (US)

( * ) Notice: Subject to any disclaimer, the term of this patent is extended or adjusted under 35 U.S.C. 154(b) by 308 days.

(21) Appl. No.: 10/903,470

(22) Filed: Jul. 31, 2004

(65) Prior Publication Data
US 2005/0141573 A1  Jun. 30, 2005

Related U.S. Application Data

(60) Provisional application No. 60/533,934, filed on Dec. 31, 2003.

(51) Int. Cl.
G03B 21/00 (2006.01)
G03B 21/28 (2006.01)
G02F 1/00 (2006.01)

(52) U.S. Cl. ............. 353/31; 353/99; 348/769

(58) Field of Classification Search ............... 348/754, 348/769; 353/99, 31
See application file for complete search history.

(56) References Cited

U.S. PATENT DOCUMENTS

| 3,495,892 | A | | 2/1970 | Dailey |
| 4,833,528 | A | * | 5/1989 | Kobayashi ............... 348/196 |
| 4,956,655 | A | * | 9/1990 | Wakebe ................... 353/101 |
| 5,132,834 | A | | 7/1992 | Sinada |
| 5,463,493 | A | | 10/1995 | Shah |
| 5,463,528 | A | * | 10/1995 | Umezawa ................. 361/699 |
| 6,170,953 | B1 | | 1/2001 | Lee |
| 6,483,556 | B1 | * | 11/2002 | Karakawa et al. ........ 348/750 |
| 6,755,536 | B2 | * | 6/2004 | Tegreene et al. ........... 353/94 |
| 6,803,937 | B2 | * | 10/2004 | Hirooka et al. ........... 347/236 |
| 2003/0151790 | A1 | | 8/2003 | Romanovsky |

FOREIGN PATENT DOCUMENTS

| DE | 35 45 456 A1 | 7/1986 |
| EP | 0 867 744 A2 | 9/1998 |
| GB | 1 257 990 | 12/1971 |
| GB | 2 309 807 | 7/1997 |
| JP | 2001-189520 | 7/2001 |
| WO | WO 85/01175 | 3/1985 |
| WO | WO 00/79345 A1 | 12/2000 |

* cited by examiner

Primary Examiner—W B Perkey
(74) Attorney, Agent, or Firm—Kirschstein, et al.

(57) ABSTRACT

A laser projection device suitable for displaying full color images is disclosed. The LPD includes a variety of techniques for modulating laser beams produced by one or more lasers with image data to controllably produce the image using a modified raster scan.

3 Claims, 16 Drawing Sheets

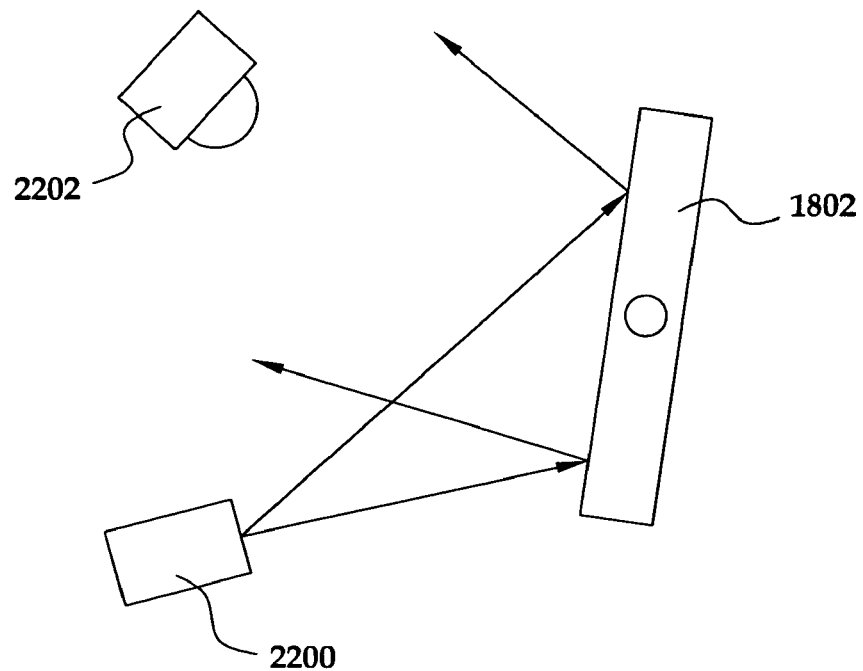
FIGURE 22
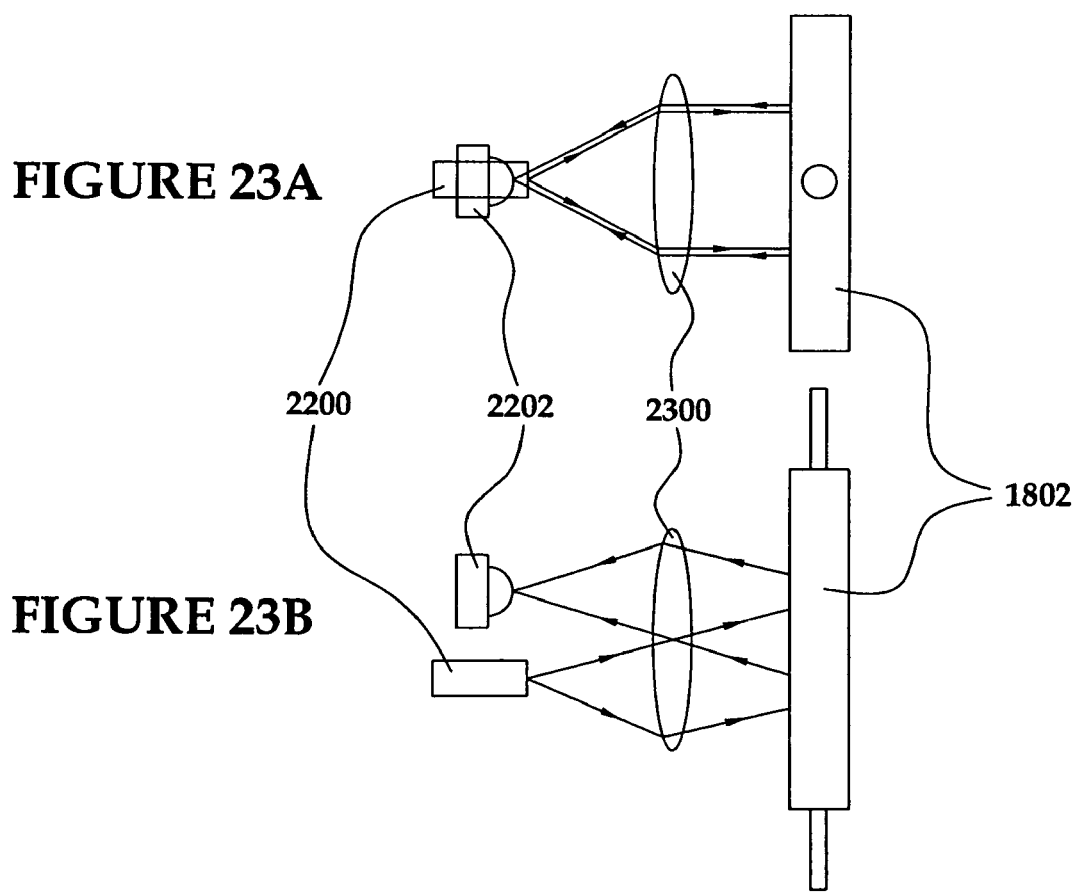
FIGURE 23A
FIGURE 23B

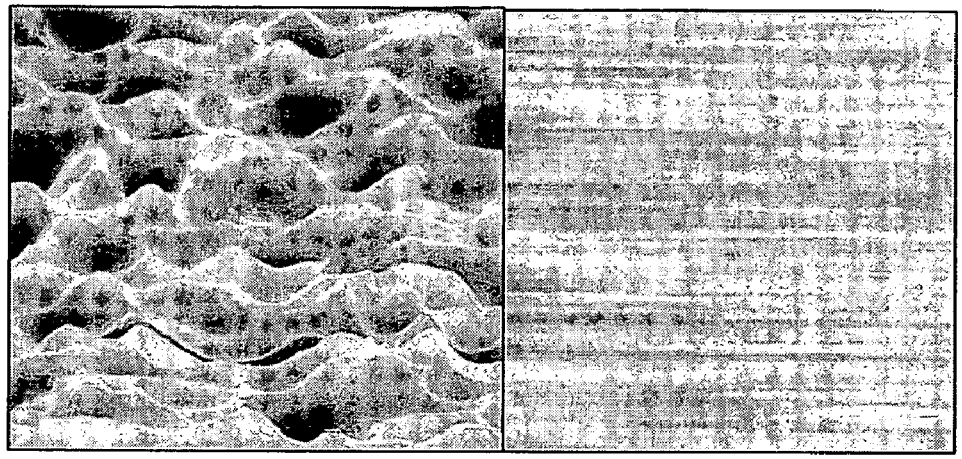
60° LSD
SEM Structure 1500x
0.2° x 40° LSD
SEM Structure 75x
FIGURE 24
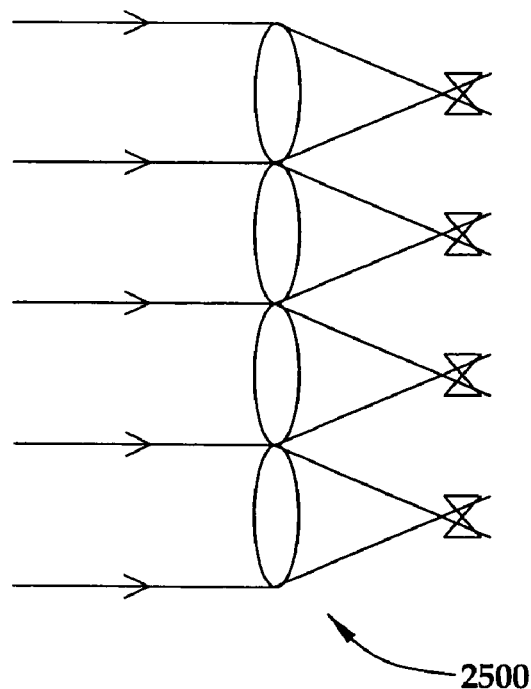
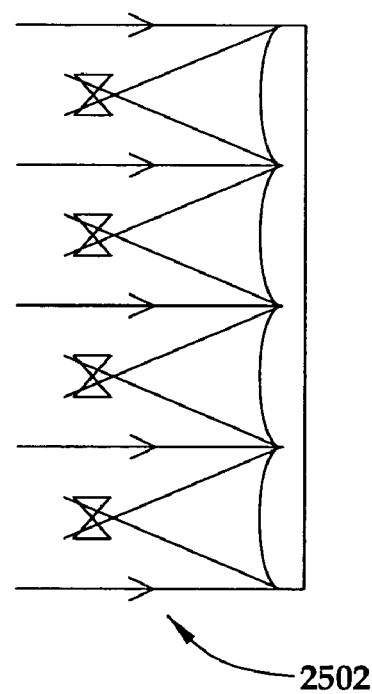
FIGURE 25A  FIGURE 25B

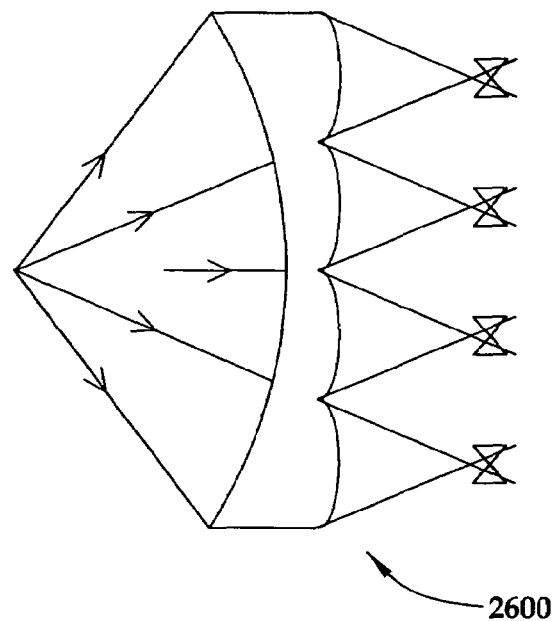
FIGURE 26
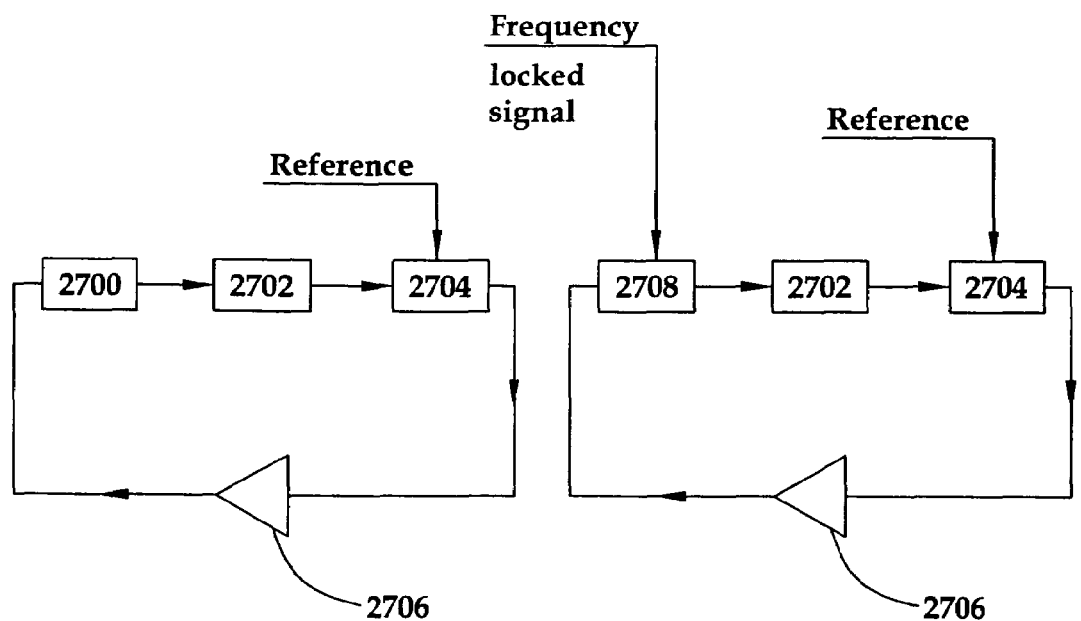
FIGURE 27A          FIGURE 27B

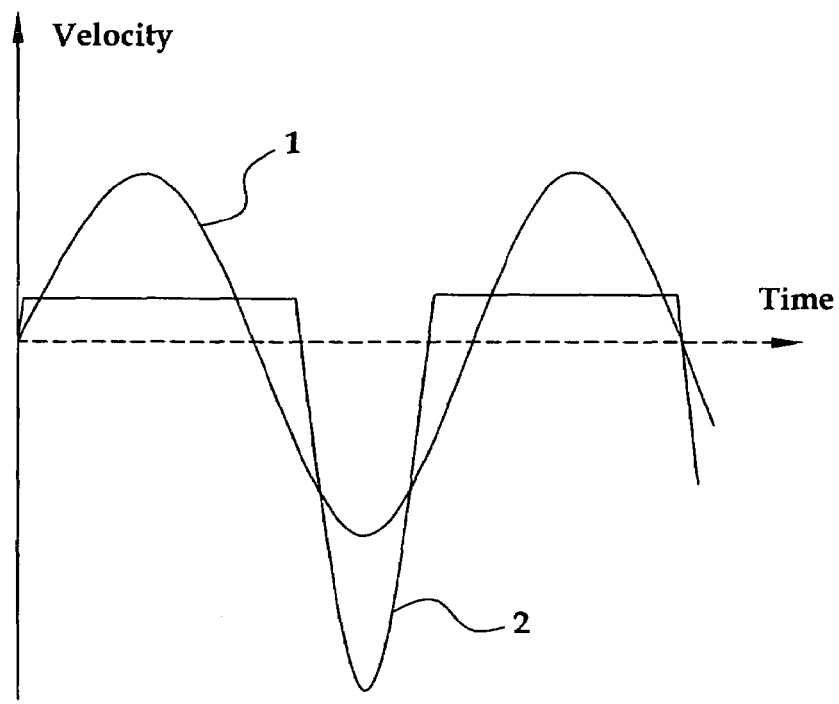
FIGURE 30
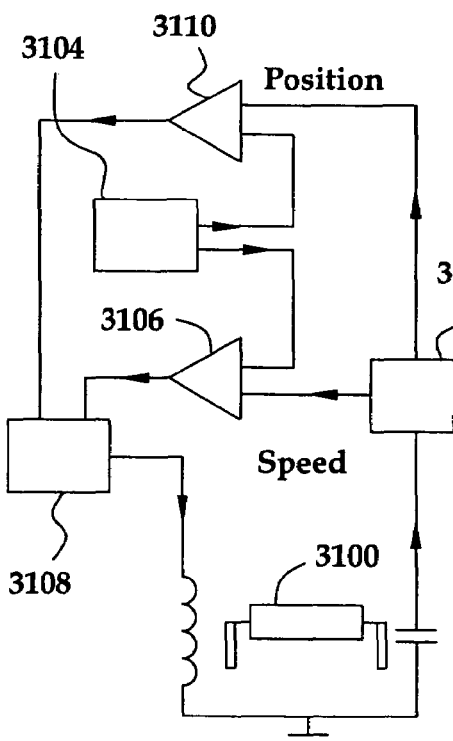 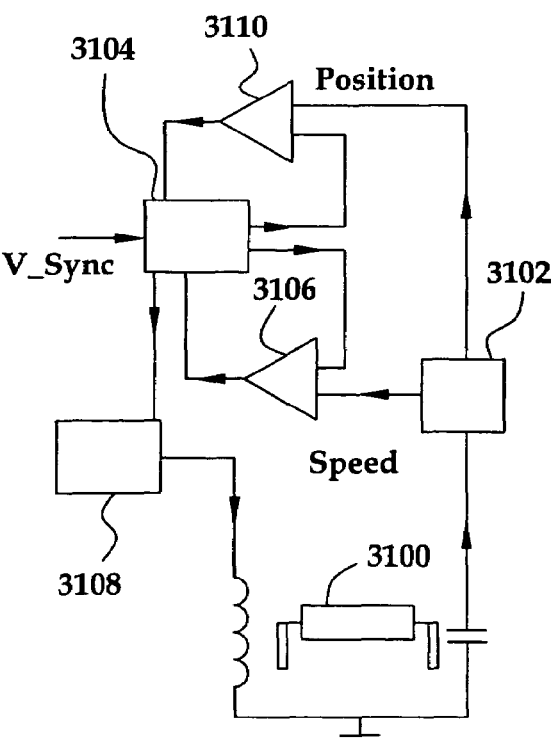
FIGURE 31A          FIGURE 31B

METHOD AND APPARATUS FOR CONTROLLABLY MODULATING A LASER IN A LASER PROJECTION DISPLAY

This is a continuation of a provisional application U.S. Ser. No. 60/533,934 filed Dec. 31, 2003.

BACKGROUND OF THE INVENTION

1. Field of the Invention

This invention relates generally to electronic displays, and, more particularly, to a multi-color Laser Projection Display (LPD).

2. Description of the Related Art

Single-color or monochrome LPDs have been implemented using a raster-based scanning system. A raster-based LPD uses a laser and oscillating mirror(s) that move in horizontal and vertical directions to scan the laser light over a viewing screen in a raster pattern. By controllably modulating the laser in time with the movements of the mirror(s), a two-dimensional image can be produced. In fact, the LPD can produce a high quality image, such as VGA or higher resolution by modulating the mirrors at frequencies in the range of 10's and 100's of MHz.

Monochrome displays, however, have limited utility, whereas full color displays are in wide use and are desired and accepted by the general public. Full-color LPDs may be produced by controllably combining red, blue and green laser light to produce a wide spectrum of colors. Generally, red, blue and green lasers are commercially available, but not in small-form factors, such as semiconductor laser diodes, and modulating these lasers with image data has proven to be difficult.

The present invention is directed to overcoming, or at least reducing, the effects of one or more of the problems set forth above.

SUMMARY OF THE INVENTION

In one aspect of the instant invention, a method for modulating a laser beam is provided. The method comprises delivering a laser beam to an acousto-optic crystal; and generating an acoustic wave in the acousto-optic crystal to divert at least a portion of the optical energy from the laser beam into at least one side beam.

In another aspect of the instant invention, a method for modulating a laser beam is provided. The method comprises delivering a laser beam to an electro-optic device; rotating polarization of the laser beam by a degree determined from image data to produce a rotated laser beam; and delivering the rotated laser beam to a polarizer to block a portion of the laser beam depending upon the degree of rotation of the rotated laser beam.

In still another aspect of the instant invention, a method for modulating a laser beam is provided. The method comprises delivering a laser beam to a frequency multiplying crystal; and shifting phase-matching characteristics within the crystal to controllably reduce the power of a laser beam delivered from the frequency multiplying crystal.

In yet another aspect of the instant invention, a method for modulating a laser beam is provided. The method comprises delivering a laser beam to a beam splitter to produce a first and second laser beam; and controllably altering the phase of at least one of the first and second laser beams prior to recombining the first and second laser beams to produce a combined laser beam having reduced intensity.

BRIEF DISCRETION OF THE DRAWINGS

The invention may be understood by reference to the following description taken in conjunction with the accompanying drawings, in which like reference numerals identify like elements, and in which.

Figure 13:
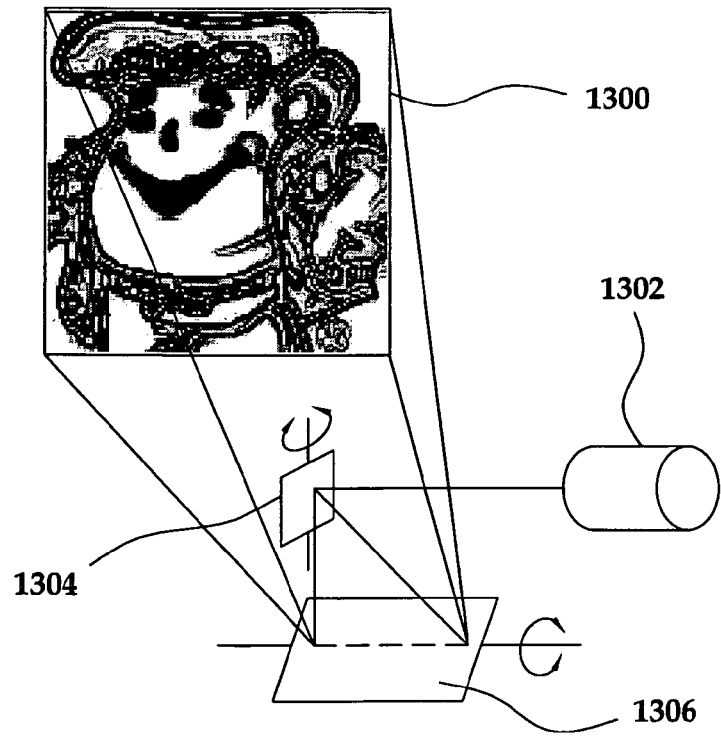
Figure 14:
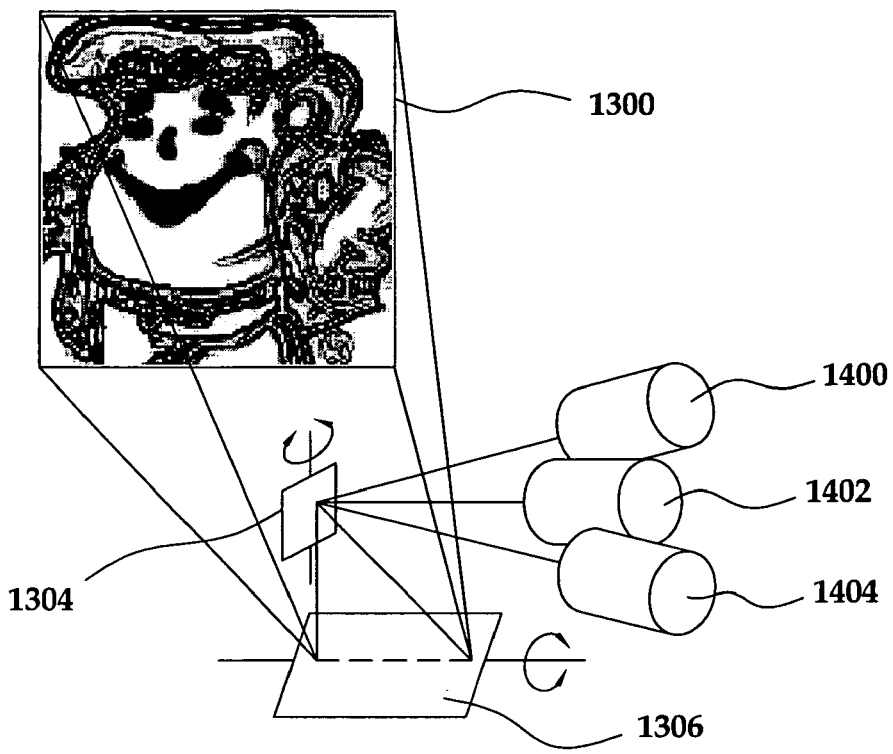
Figure 15:
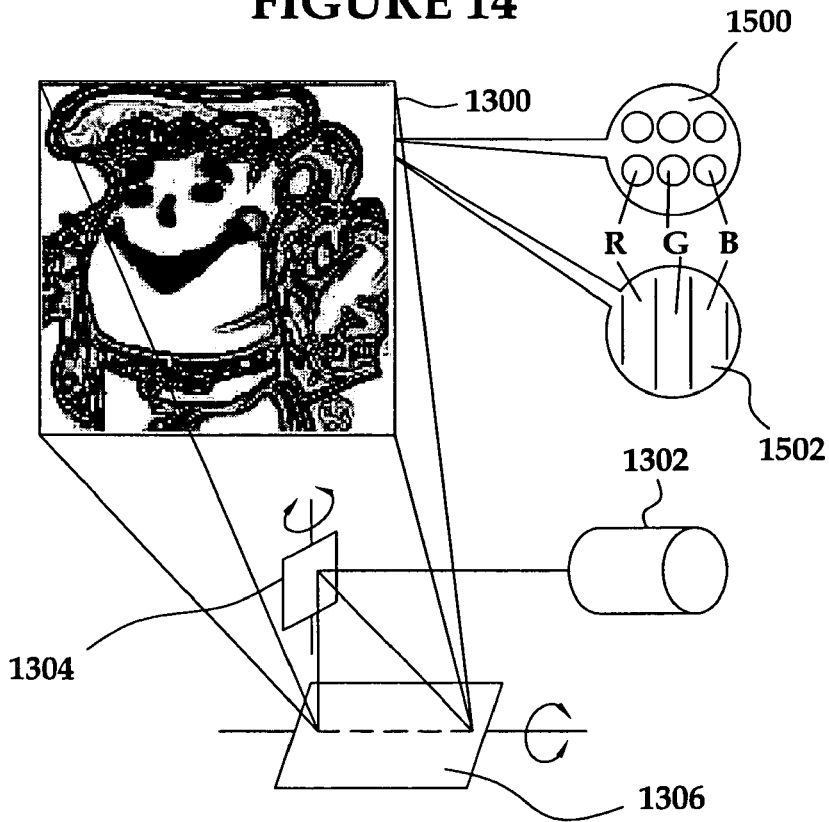
Figure 16A:
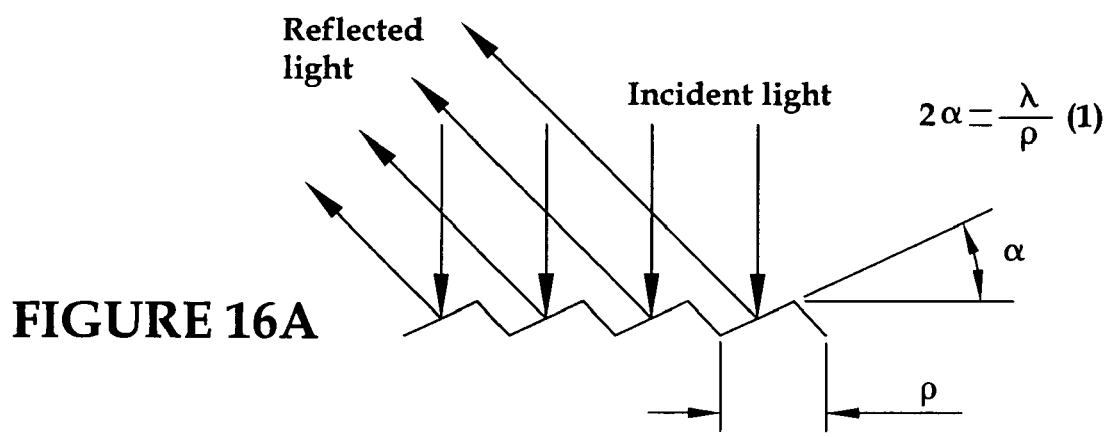
Figure 16B:
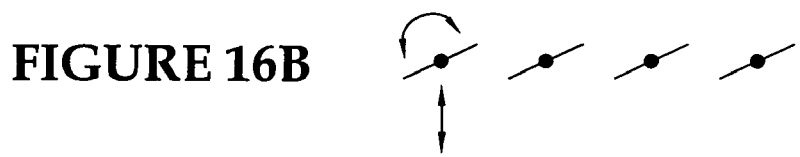
Figure 16C:
Figure 17:
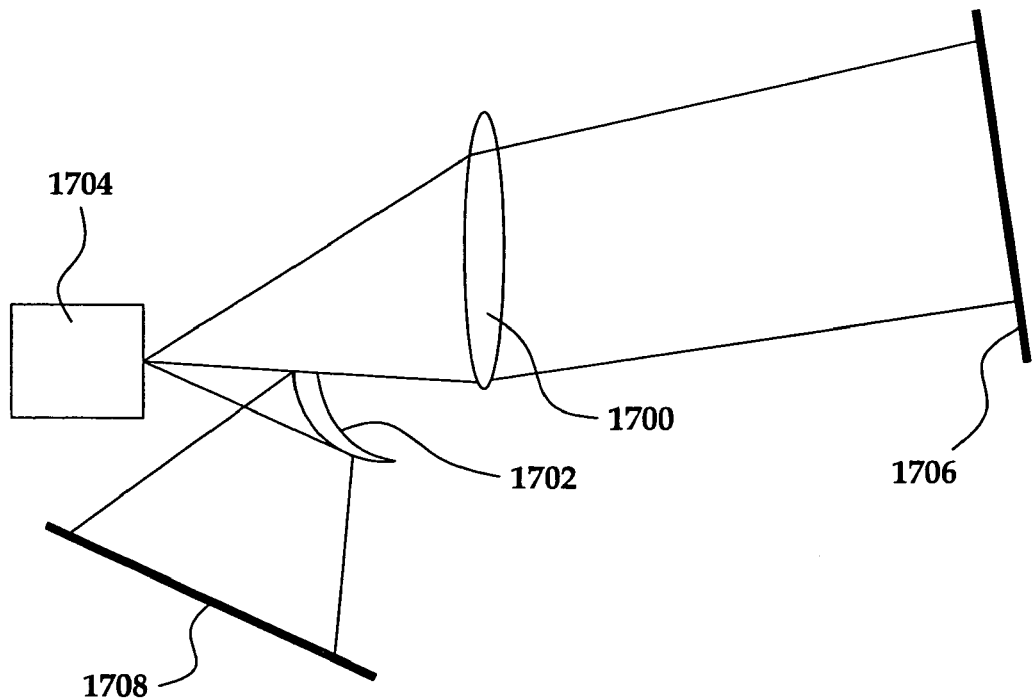
Figure 18:
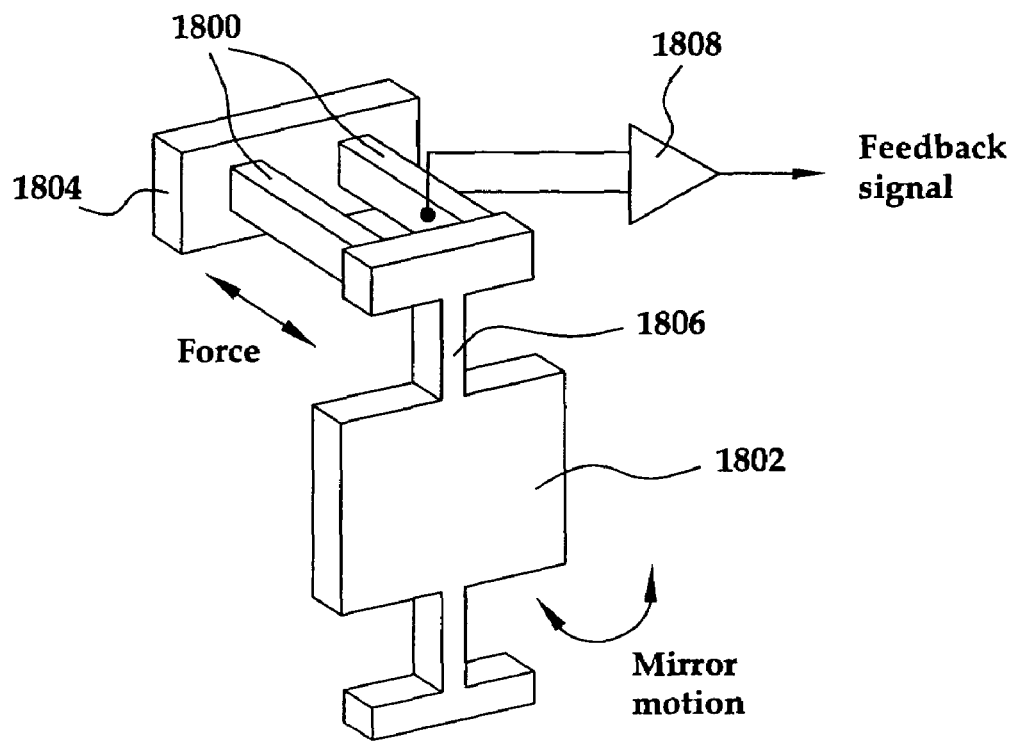
Figure 19:
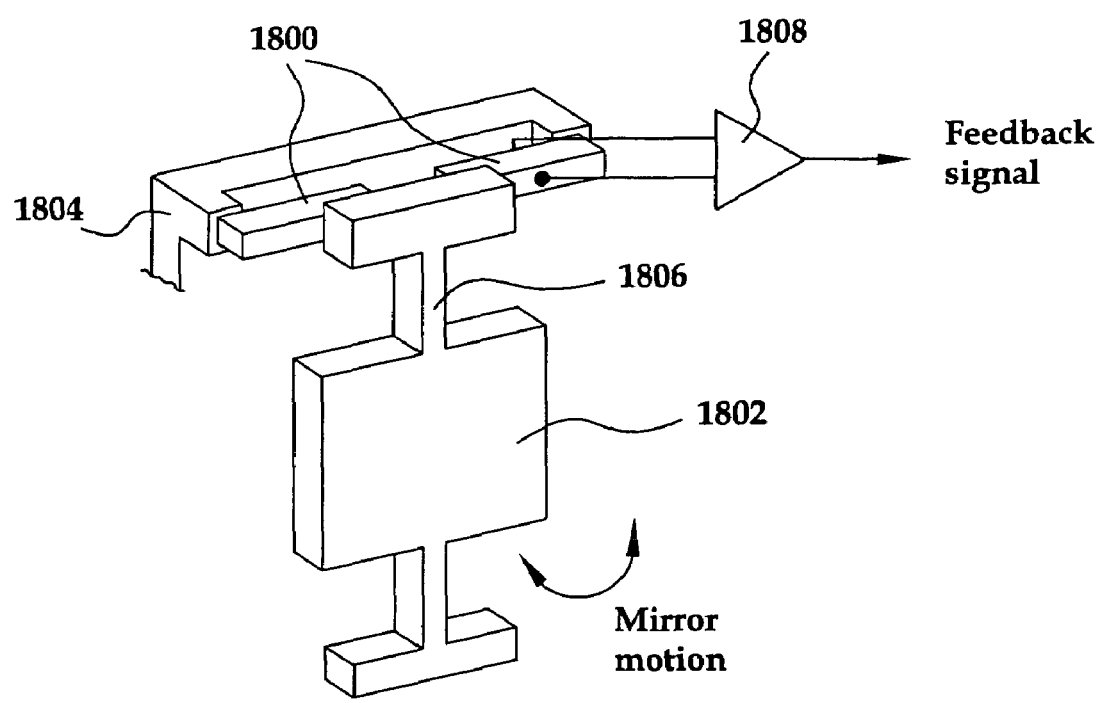
Figure 20:
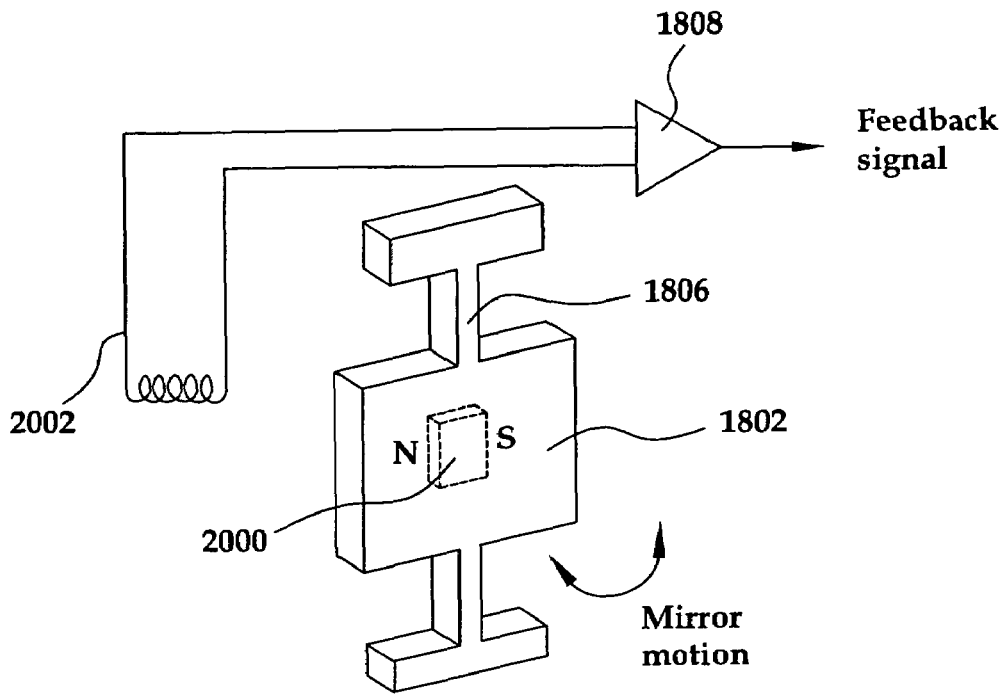
Figure 21:
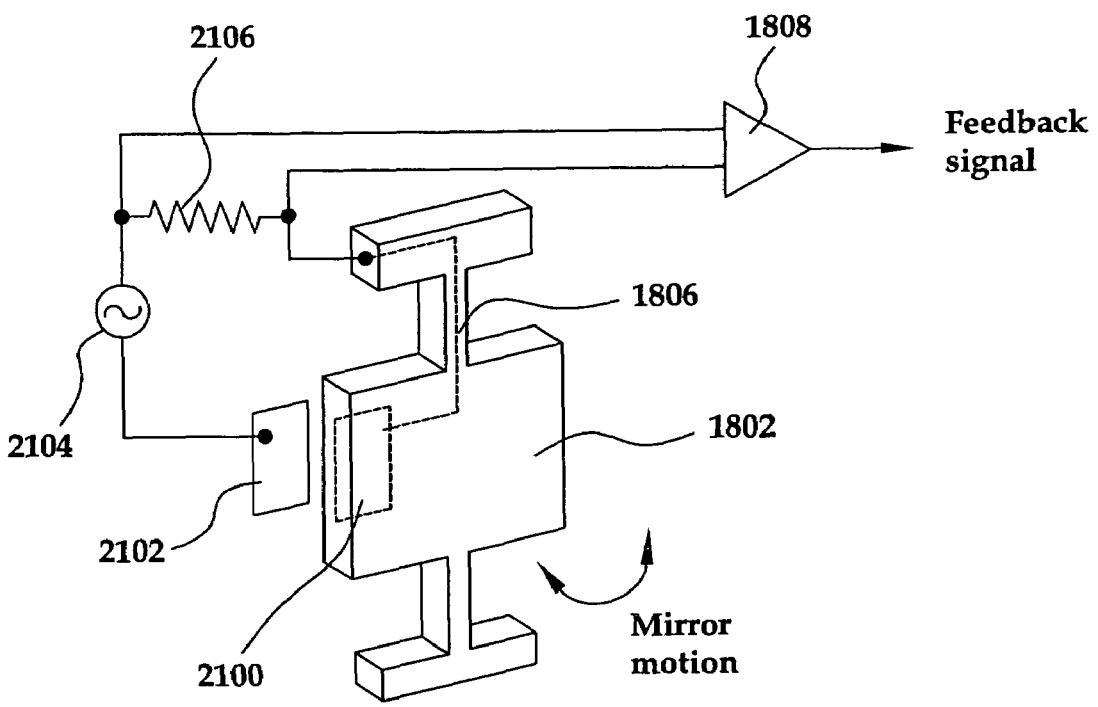
Figure 28A:
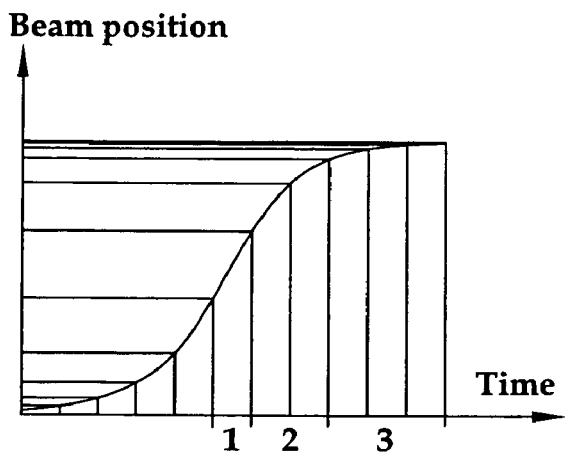
Figure 28B:
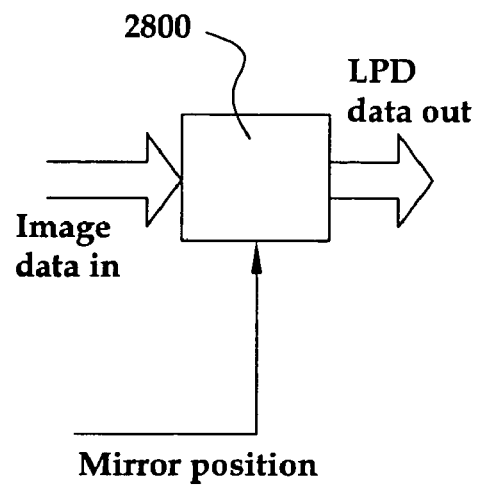
Figure 29A:
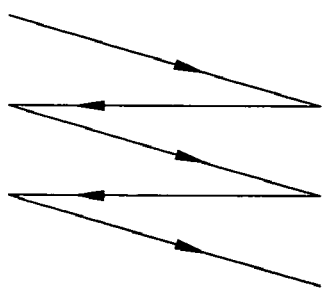
Figure 29B:
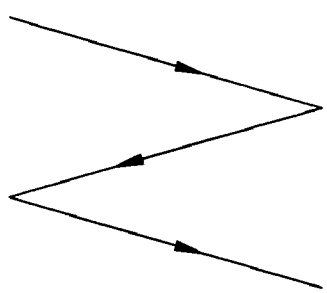
Figure 29C:
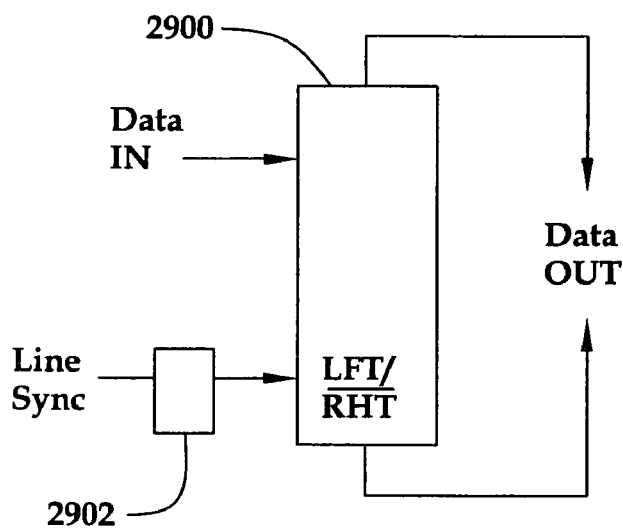

FIG. 13 stylistically shows one embodiment of a system capable of producing a multi-color display;

FIG. 14 stylistically shows one embodiment of a system capable of producing a multi-color display;

FIG. 15 is stylistically shows one embodiment of a system capable of producing a multi-color display;

FIGS. 16A-C stylistically show embodiments of mirror structures that may be employed in the instant invention;

FIG. 17 stylistically shows a mirror and lens arrangement that provides two displays from a single LPD;

FIG. 18 stylistically shows one embodiment of a system for determining mirror position;

FIG. 19 stylistically shows one embodiment of a system for determining mirror position;

FIG. 20 stylistically shows one embodiment of a system for determining mirror position;

FIG. 21 stylistically shows one embodiment of a system for determining mirror position;

FIG. 22 stylistically shows one embodiment of a system for determining mirror position;

FIGS. 23A and 23B stylistically show one embodiment of a system for determining mirror position;

FIG. 24 is a magnified view of two types of viewing screens that may be employed with an LPD;

FIGS. 25A and 25B stylistically illustrate embodiments of two screens that may be employed with an LPD;

FIG. 26 stylistically illustrates one embodiment of a screen that may be employed with an LPD;

FIGS. 27A and 27B stylistically illustrate two embodiments of voltage controlled oscillators that may be employed in the instant invention;

FIGS. 28A and 28B stylistically illustrate a graph of beam position versus time and a Look-up table to correct for non-linear aspects of the graph;

FIGS. 29A through 29C stylistically illustrate beam tracking patterns and a buffer arrangement used to correct for reverse tracking;

FIG. 30 stylistically illustrates mirror velocity as function of time; and

FIGS. 31A and 31B illustrate alternative embodiments of a system for closed loop control of mirror speed and position;

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
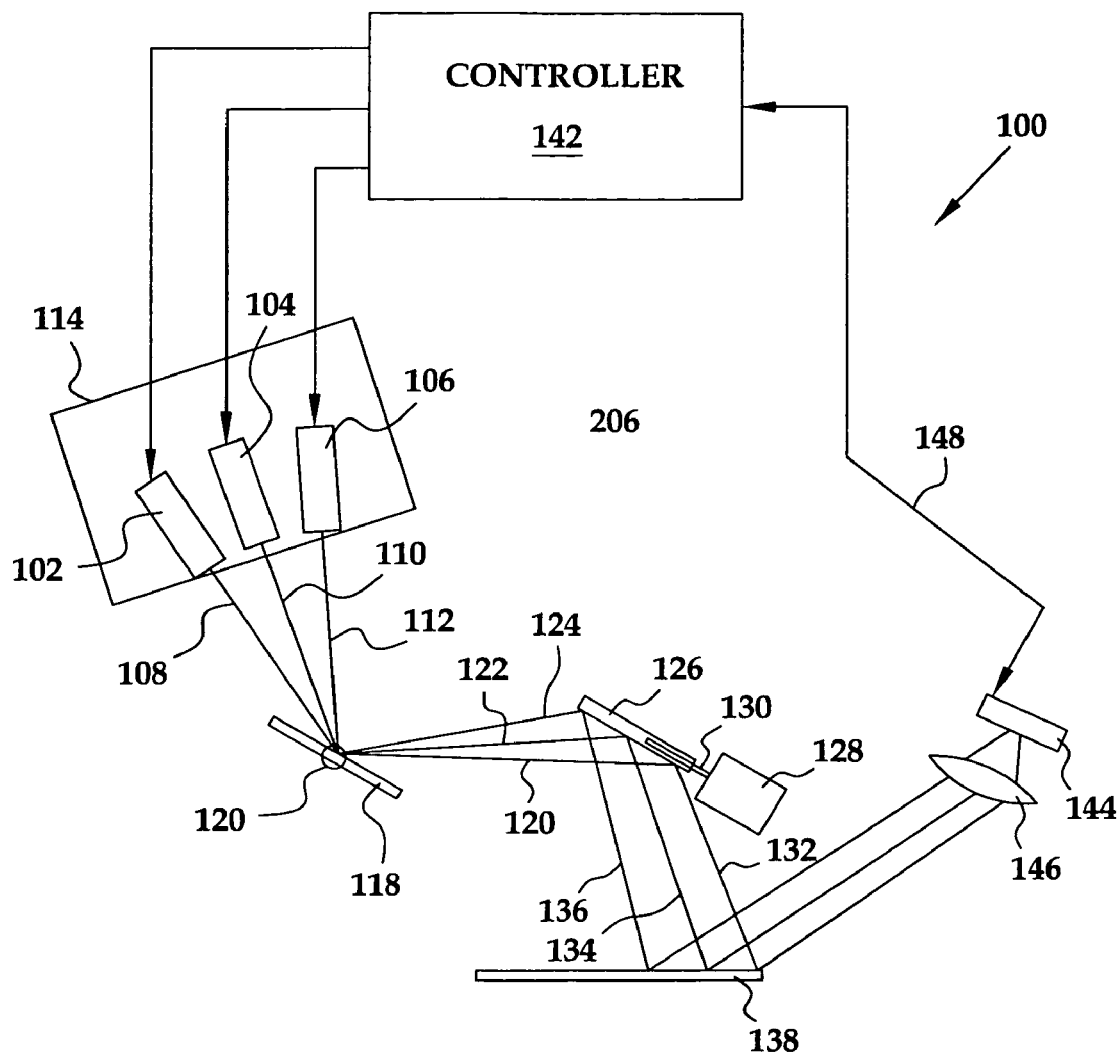
FIG. 1 is a stylistic block diagram of a top level view of one embodiment of a laser projection device (LPD) that may be employed in the present invention.

Turning now to the drawings, and specifically referring to FIG. 1, a stylistic block diagram of a laser projection display (LPD) 100, in accordance with one embodiment of the present invention, is shown. In the illustrated embodiment, the LPD 100 includes three lasers 102, 104, 106, each capable of emitting a beam of light 108, 110, 112 consisting of a unique color, such as red, green or blue. Those skilled in the art will appreciate that the number of lasers and the color of light emitted therefrom may be varied without departing from the spirit and scope of the instant invention.

The lasers 102, 104, 106 are arranged in a common plane 114 with the beams of light 108, 110, 112 being angularly directed relative to one another to fall on a substantially common location 116 on a first scanning device, such as a first scanning mirror 118, from where they are reflected as beams of light 120, 122, 124. In the illustrated embodiment, the first scanning mirror 118 oscillates on an axis 120 at a relatively high rate (e.g., about 20-30 KHz). Rotation or oscillation of the first scanning mirror 118 causes the beams of light 108, 110, 112 to be moved. That is, as the angular position of the first scanning mirror 118 alters, so too does the angle of reflection of the beams of light 120, 122, 124 from the first scanning mirror 118. Thus, as the mirror oscillates the reflected beams of light 120, 122, 124 are scanned to produce movement of the beams of light 120, 122, 124 along one component of the two-dimensional display.

The second component of the two-dimensional display is produced by a second scanning device, such as a mirror 126. In the illustrated embodiment, the second mirror 126 is coupled to a motor 128 at a pivot point 130 so as to produce rotational or oscillating movement about an axis that is substantially orthogonal to the axis of rotation of the first mirror 118. The beams of light 120, 122, 124 are reflected off of the second mirror 126 as beams of light 132, 134, 136 and directed to a viewing surface 138. The viewing surface 138 may take on any of a variety of forms without departing from the spirit and scope of the instant invention. For example, the viewing surface 138 may be a fixed screen that may be front or back lit by the lasers 102, 104, 106 and may be contained in a housing (not shown) that is common with the LPD 100, or alternatively, the viewing surface 138 may take the form of any convenient, generally flat surface, such as a wall or screen, spaced from the LPD 100.

Figure 2:
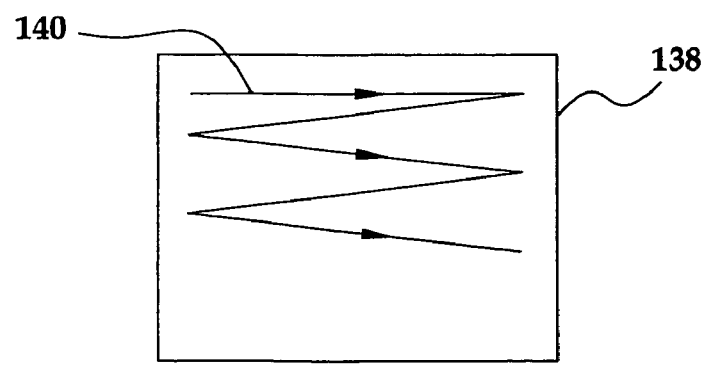
FIG. 2 is a stylistic view of a viewing surface shown in FIG. 1.

The second mirror 126 oscillates or rotates at a relatively slow rate, as compared to the rate of the first mirror 118 (e.g., about 60 Hz). Thus, it will be appreciated that, as shown in FIG. 2, the beams of light 132, 134, 136 generally follow a path 140 on the display surface 138. Those skilled in the art will appreciate that the path 140 is similar in shape and concept to a raster scan commonly employed in cathode ray tube televisions and computer monitors.

While the instant invention is described herein in the context of an embodiment that employs separate first and second scanning mirrors 118, 126, those skilled in the art will appreciate that a similar path 140 may be produced by using a single mirror. The single mirror would be capable of being moved about two axis of rotation to provide the fast and slow oscillating movements along two orthogonal axes.

As is apparent from FIG. 1, owing to the angular positioning of the lasers 102, 104, 106, even though the lasers 102, 104, 106 have been arranged mechanically and optically to deliver the beams of light 108, 110, 112 within the same plane 114 and at the same point (on the rotational axis 120) on the mirror 118), each has a different angle of reflection, which causes the beams of light 120, 122, 124 to diverge. A controller 142 is provided to controllably energize the lasers 102, 104, 106 to effectively cause the beams of light 120, 122, 124 to be collinear, such that they may be reflected off of the second mirror 126 and delivered to the same point on the viewing surface 138 relatively independent of the distance of the viewing surface 138 from the second mirror 126.

Figure 3A:
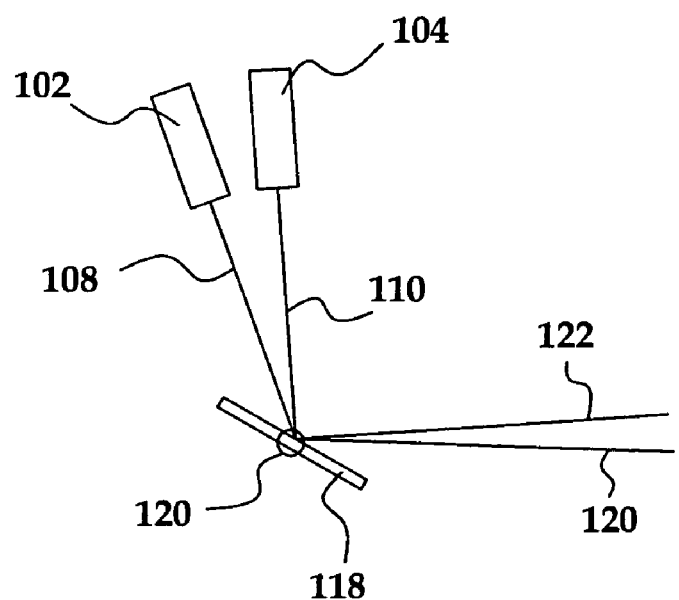
FIGS. 3A and 3B depict a top view of a scanning device at various times during its operation.
Figure 3B:
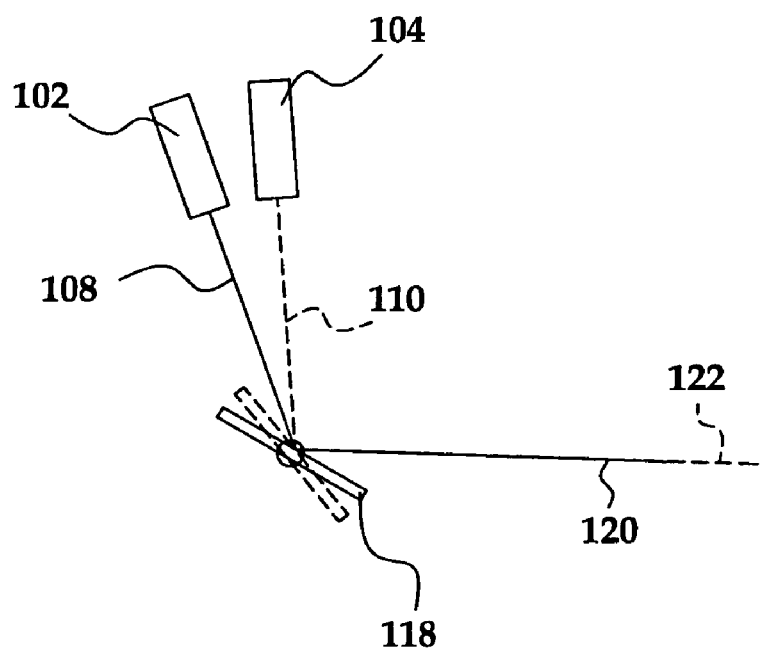

Turning now to FIGS. 3A and 3B, the operation of the controller 142 to cause the beams of light 120, 122, 124 to be collinear is discussed. To simplify the discussion, only two lasers 102, 104 are illustrated in FIG. 3, but those skilled in the art will appreciate that the concepts discussed herein may be extended to three or more lasers without departing from the spirit and scope of the instant invention. As shown in FIG. 3A, if the lasers 102, 104 are energized simultaneously, the reflected beams of light 120, 122 diverge. However, as shown in FIG. 3B, if the lasers 102, 104 are energized at slightly different times, then the beams of light 120, 122 can be made to follow a single, common path (i.e., the beams of light 120, 122 are collinear). For example, if the laser 102 is energized at a first time t1, then the mirror 118 will be at a first position, as represented by the solid lines, and the beam of light 108 will reflect off of the mirror 118 as the beam of light 120. Subsequently, if the laser 104 is energized at a second time t2, then the mirror 118 will be at a second position, as represented by the dashed lines, and the beam of light 110 will reflect off of the mirror 118 as the beam of light 122. By precisely controlling the time t2, the mirror 118 will be in a position to accurately reflect the beam of light 122 along substantially the same path as the beam of light 120.

Thus, through the operation of the controller 142, the beams of light 120, 122 are substantially collinear, but are slightly displaced in time. That is, the beams of light 120 122 will now both be projected onto substantially the same point on the display surface 138, but at slightly different times. However, owing to the persistence of the human eye, the variation in timing is not detectable. That is, in the case of the three laser system described in FIG. 1, each of the lasers 102, 104, 106 will controllably deliver laser light of a unique color and intensity to substantially the same point on the viewing surface 138 within a relatively short window of time. The human eye will not detect the three separate colors, but rather will perceive a blending of the three light beams such that a consistent and desired hue appears at that point on the viewing surface. Those skilled in the art will appreciate that this process may be repeated numerous times along the path 140 to recreate a picture on the viewing surface 138.

Figure 4:
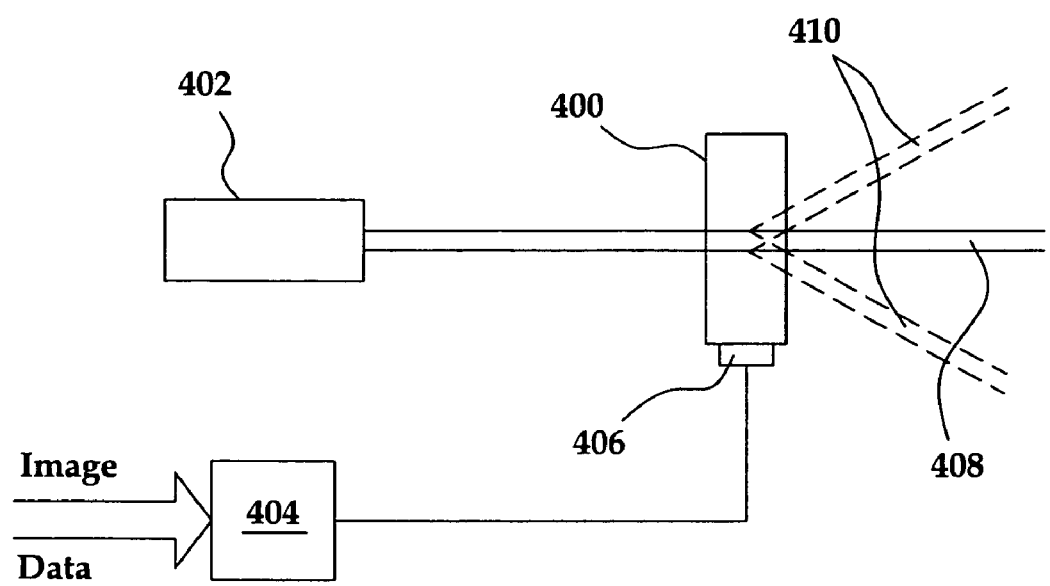
FIG. 4 is one embodiment of a circuit that may be used to control operation of a laser used in the system described in FIGS. 1-4.

As discussed above, the lasers 102, 104, 106 may be controlled to display an image. Controlling the lasers 102, 104, 106 involves controllably moving and modulating the laser light. Turning now to FIG. 4, one embodiment of a modulation scheme that may be employed in the instant invention is shown. An acousto-optic crystal 400 is positioned in front of a laser 402. A modulator 404 converts image data into RF signals, which drive a piezoactuator 406, coupled to the crystal 400. Acoustic waves, induced by the piezoactuator 406 propagate through the crystal 400, turning it into a grating, which, depending on the intensity of acoustic waves, diverts part of the optical energy from a main beam 408 into a plurality of side beams 410, thus modulating the beam 408 with image data.

Figure 5:
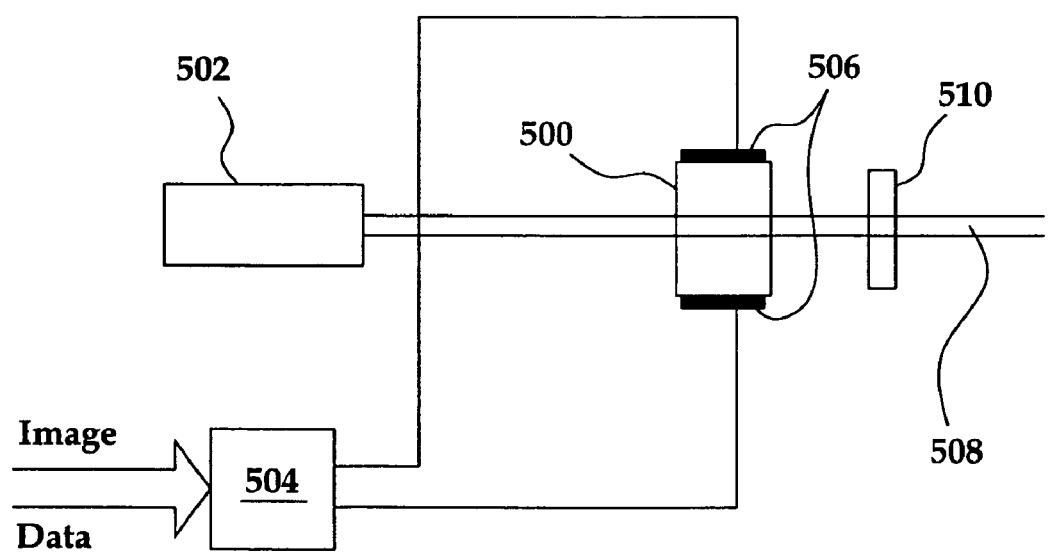
FIG. 5 is one embodiment of a circuit that may be used to control operation of a laser used in the system described in FIGS. 1-4.

The intensity of the laser light may also be controlled by the circuitry shown in FIG. 5. An electro-optic device 500, such as a Kerr cell or Pockels cell is positioned in front of a laser 502. The electro-optic device 500 possesses the property of rotating the polarization of the light passing through it. A modulator 504 converts image data into electric signals, which are applied to electrodes 506. The electrical signals applied to the electrodes 506 cause polarization of a laser beam 508 to rotate, depending on the magnitude of the voltage applied to the electrodes 506. Upon exiting the electro-optic device 500, the laser beam 508 is delivered to a polarizer 510. The direction of polarization of the polarizer 510 is selected to coincide with the direction of polarization of the laser 502. Thus, the amount of light passing through the polarizer 510 depends on how much the polarization of the beam 508 differs from its original direction, and hence intensity of the beam 508 is modulated by image data.

Figure 6:
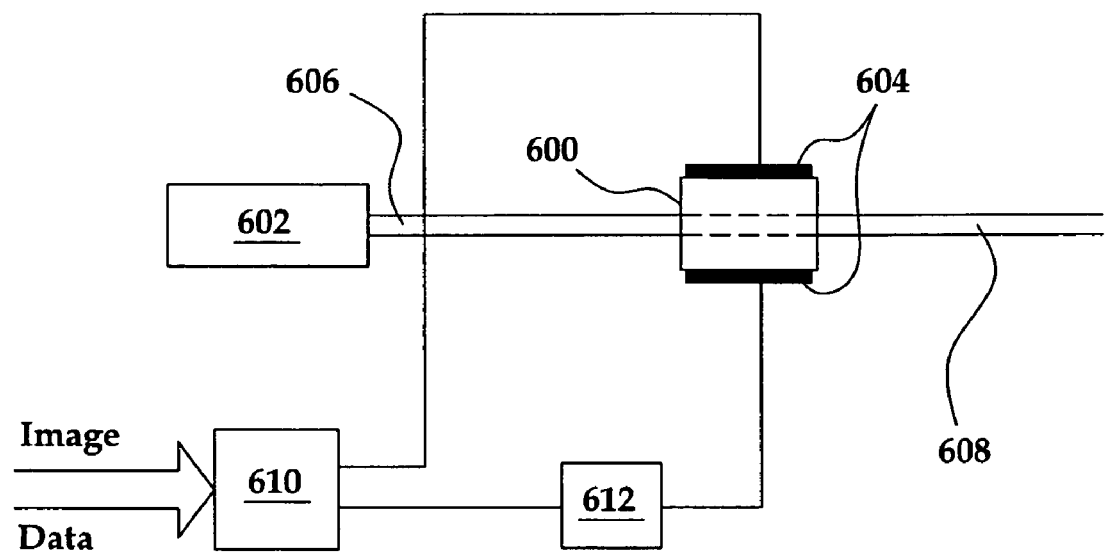
FIG. 6 is one embodiment of a circuit that may be used to control operation of a laser used in the system described in FIGS. 1-4.

Alternatively, modulation of the laser may be accomplished by the circuitry shown in FIG. 6. In one embodiment of the instant invention, IR light from a laser 602 may be converted into shorter wavelength light (for example, green or blue) by a frequency doubling crystal 600. Applying a voltage to the crystal 600 through electrodes 604 shifts phase-matching conditions inside the crystal 600 between the input IR beam 606 and an output visible beam 608, thus changing conversion efficiency and output power. A modulator 610 generates voltage according to image data. Additionally, a bias generator 612 may change a bias voltage on the crystal 600 to compensate for temperature change and preserve optimal phase matching conditions in the crystal 600.

Figure 7:
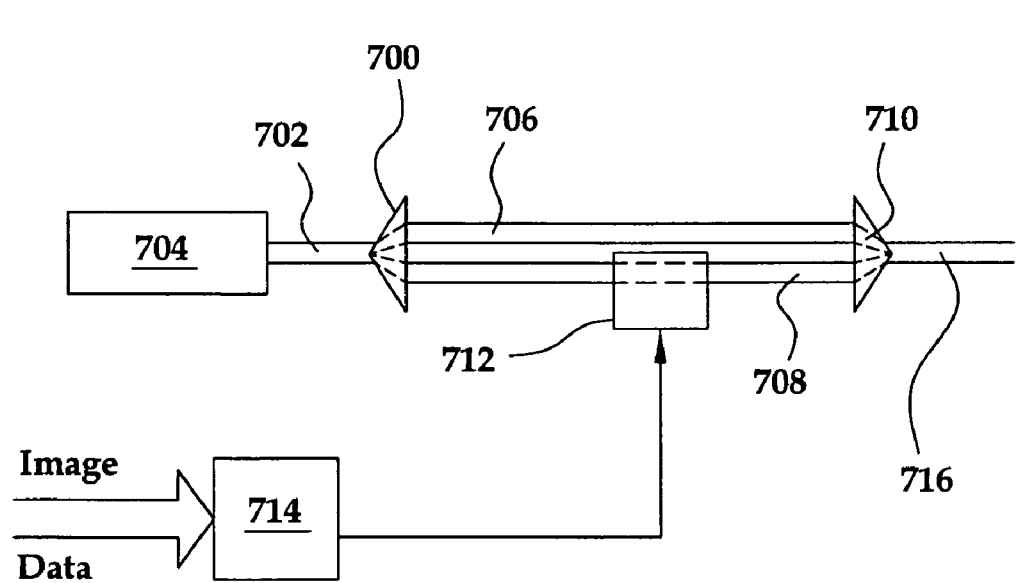
FIG. 7 is one embodiment of a circuit that may be used to control operation of a laser used in the system described in FIGS. 1-4.

FIG. 7 illustrates another embodiment of circuitry that may be employed to modulate the laser light. A beam splitter 700 splits a beam of light 702 from a laser 704 into two sub-beams 706, 708. While the beam 706 proceeds straight to a beam combiner 710, the beam 708 passes through an optical delay element 712 (e.g., micro-machined or electro-optical), which introduces a delay that is controlled by a modulator 714 according to image data. When the beams 706, 708 are recombined by the combiner 710, the intensity of an output beam 716 varies depending on phase relationship between the beams 706, 708. If they are in phase (i.e., zero delay applied to the beam 708) the intensity of the output beam 716 is the highest. If they are in opposite phase (i.e., the beam 708 is delayed by a half-period) the output intensity is zero.

Figure 8:
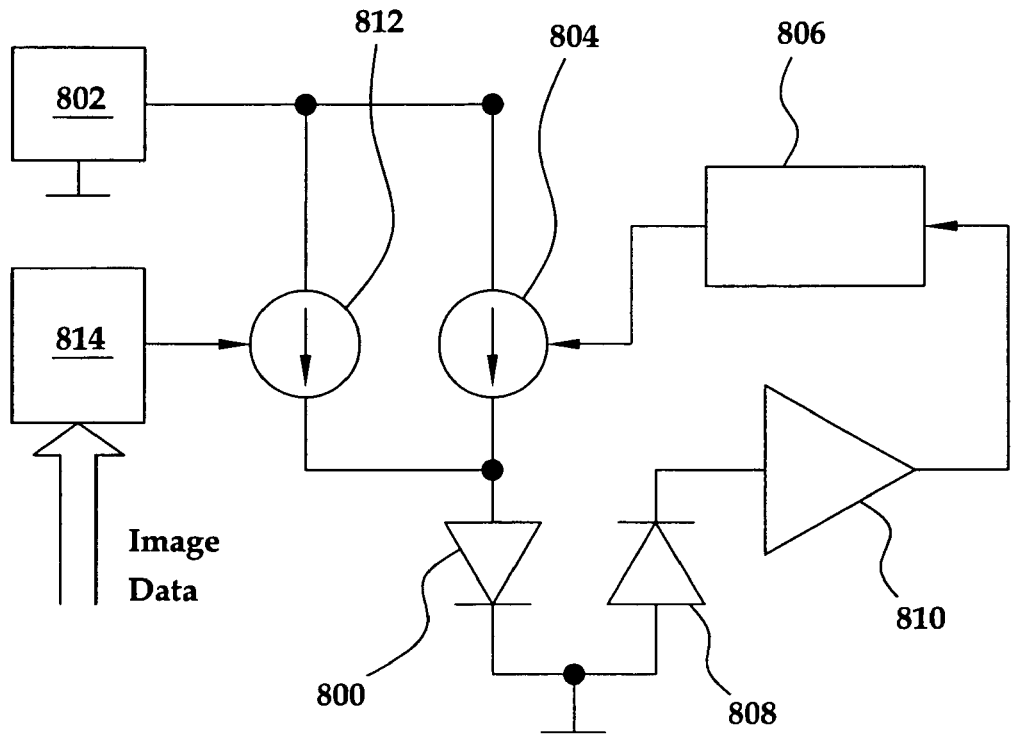
FIG. 8 is one embodiment of a circuit that may be used to control operation of a laser used in the system described in FIGS. 1-4.

Modulation of the laser light may also be provided by the circuitry set forth in FIG. 8. A laser 800 is supplied with constant bias current from power supply 802 through a first current source 804. The current source 804 is controlled by controller 806, which periodically compares the feedback signal from a laser photodiode 808, delivered through an amplifier 810 with a preselected level. A second current source 812 is controlled by a modulator 814 according to incoming image data, and its current is added to current from the first current source 804. The first current source 804 is adjusted in such way that when the current from the second current source 812 is substantially zero, the laser 800 is just above the radiation threshold. The second current source 812 is adjusted in such way that when Image Data requires maximum intensity, the laser 800, driven by combined current from sources 804, 812, radiates at full rated power. To achieve proper calibration, a dedicated part of the frame can be free from modulation.

Figure 9:
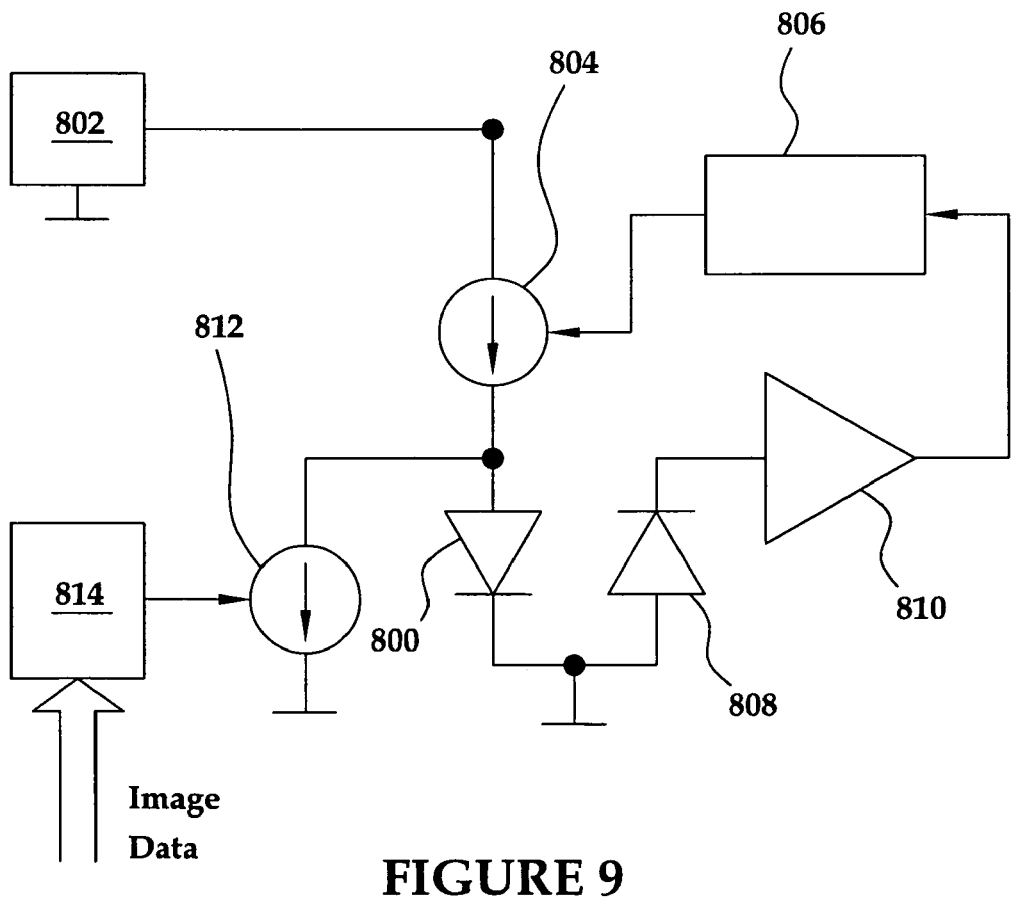
FIG. 9 is one embodiment of a circuit that may be used to control operation of a laser used in the system described in FIGS. 1-4.
Figure 10:
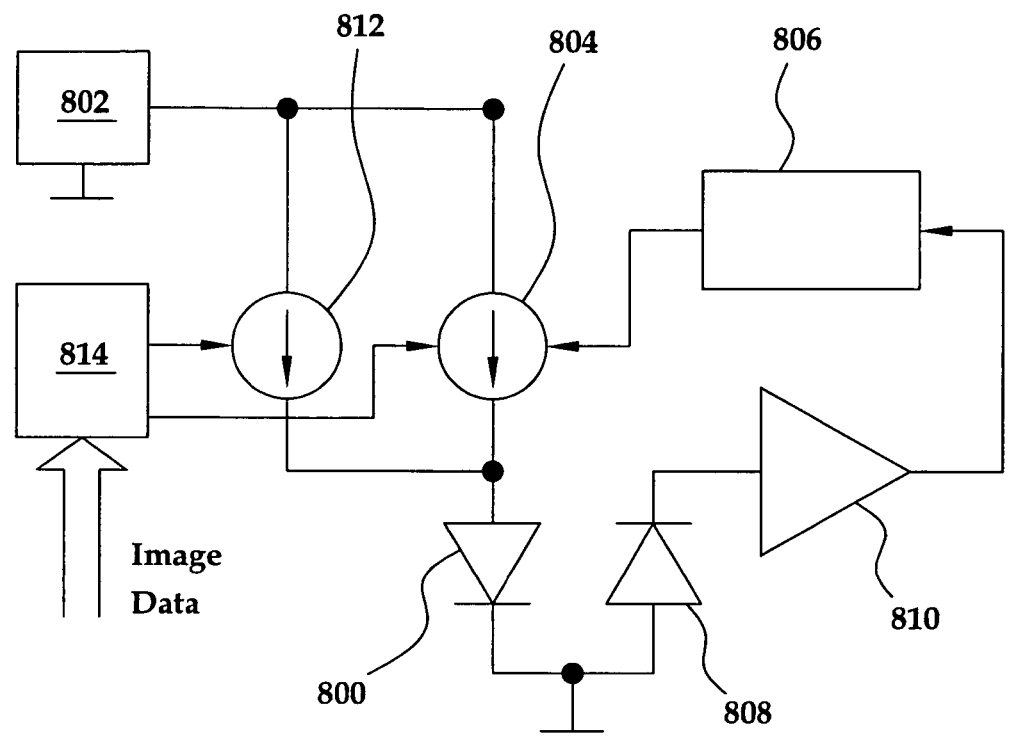
FIG. 10 is one embodiment of a circuit that may be used to control operation of a laser used in the system described in FIGS. 1-4.

Alternatively, as shown in FIG. 9, current from the second source 812 may be subtracted from, rather than added to, current from first source 804. In this case, the first current source 804 is adjusted in such way that the laser 800 radiates at full rated power when current from the second source 812 is zero. Current from the second source 812 is now inversely proportional to the image data value. Thus, when the image data calls for zero intensity, the current from second source 812 is the highest, and the laser 800 is just above the radiation threshold Yet alternatively, the modulator 814 may be able to shut the first current source 804 completely off, when image data calls for zero intensity (FIG. 10). In this case, no bias current flows through the laser 800, so power can be conserved.

Figure 11:
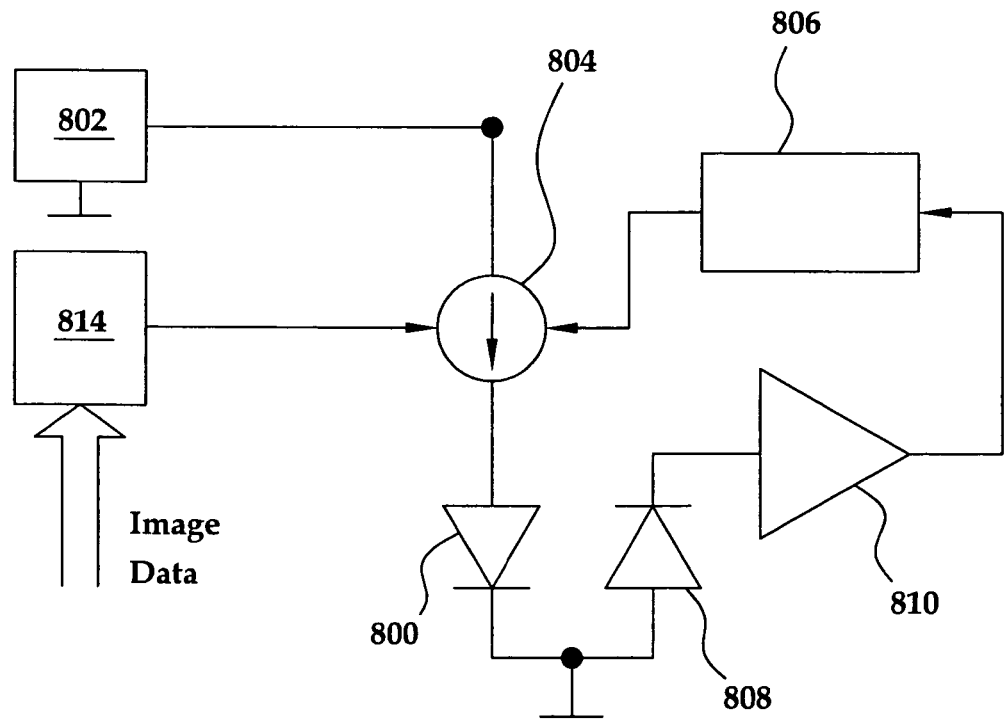
FIG. 11 is one embodiment of a circuit that may be used to control operation of a laser used in the system described in FIGS. 1-4.

Turning now to FIG. 11, yet another alternative is illustrated with the modulator 814 working in pulse-width modulation mode. A feedback loop consisting of the photodiode 808, amplifier 810 and controller 806 still adjusts the current of the source 804 in such way that the laser 80 radiates at full power when the current is enabled. The PDM modulator 814 switches the current on or off for a time proportional to image data.

Figure 12:
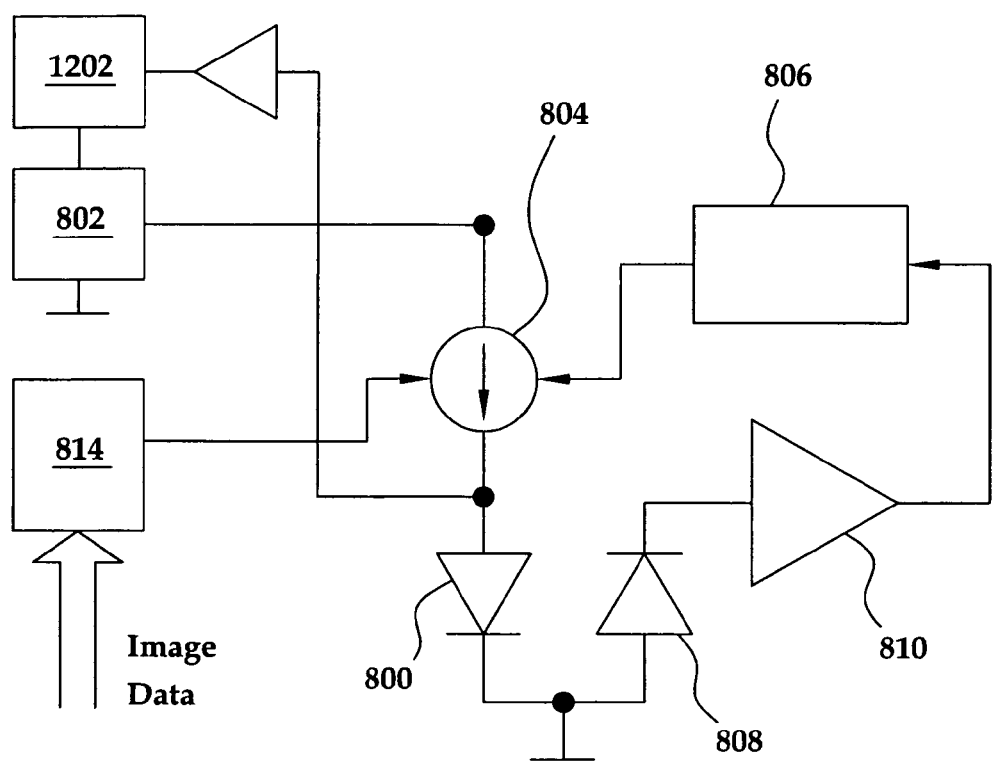
FIG. 12 is one embodiment of a circuit that may be used to control operation of a laser used in the system described in FIGS. 1-4.

In still another alternative embodiment shown in FIG. 12, the power efficiency of the laser modulation system can be improved if the power supply 802 is capable of delivering variable voltage and is controlled by an amplifier 1200 and controller 1202 in such way that the output voltage tracks changes of the dropout voltage on the laser 800.

Those skilled in the art will appreciate that the various circuits presented in FIGS. 8-12 can be readily modified to accommodate hot-case lasers instead of ground-case ones without departing from the spirit and scope of the instant invention.

Turning now to FIG. 13, as discussed above, the system is arranged to display an image on a screen 1300 by a focused beam from the laser 1302 via two mirrors 1304, 1306. In one embodiment of the instant invention, the screen 1300 may take the form of a phosphor-coated screen 1300. In one embodiment of the instant invention, the screen 1300 can be coated with up-converting phosphor (a material that emits light of shorter wavelength than the incident light). In this case, the laser 1302 can take the form of an infrared laser. Alternatively, a blue or ultraviolet laser can be used with "normal," down-converting phosphor applied to the screen 1300.

Full color image may be created by using a screen coated with a composition of three phosphors with emission wavelengths corresponding to three primary colors, and three lasers 1400, 1402, 1404, emitting in the absorption bands of those three lasers, so each laser paints the image corresponding to one primary color (FIG. 14). The phosphors can be either up-converting, or down-converting in any combination. Also, one or more colors can be painted by lasers directly. For example, the screen 1300 may be coated with a mixture of an up-converting phosphor with an absorption peak around 808 nm and an emission peak around 460 nm (blue), and a down-converting phosphor with absorption peak around 405 nm and emission peak around 550 nm (green). The red part of the image may be painted directly by a 635 nm visible laser, which is reflected from the screen without interaction with phosphors. The blue part is painted by an 808 nm IR laser, while the green part is painted by 405 nm violet laser.

Alternatively, as shown in FIG. 15, the screen 1300 may contain dots 1500 or lines 1502 of different phosphors with emission wavelengths corresponding to three primary colors, and close absorption wavelengths. Then all three phosphors can be excited by one laser emitting at their common absorption wavelength, while color components of the image will be rendered by modulating the laser intensity while it crosses respective color pixels or lines.

The laser beam can be scanned by an oscillating or rotating mirror, which may take a variety of forms, including polygonal. The laser beam can also be scanned by linearly moving a lens or an array of lenses with respect to the laser or by linearly moving a laser or an array of lasers with respect to the lens.

Blazed grating (FIG. 16A) acts as a substantially perfect mirror when the parameters of the grating satisfy Equation 1. Generally, that occurs when the phase delay of the light reflected from the edges of two adjacent lines of the grating is equal to a multiple of the wavelength. A substantially similar condition may be observed for any scan angle with an array of micro-mirrors that are turning and simultaneously moving up or down, while the array pitch is fixed (FIG. 16B).

Alternatively, a substantially similar effect can be achieved with an array of smaller mirrors, that are moving up and down only (FIG. 16c), but who's size is comparable with the wavelength of visible light (akin GLV from Silicon Light Machine).

Inducing acoustic waves in certain crystals turns them into gratings with a period equal to the acoustic wavelength. Hence a laser beam may be scanned by passing the laser beam through such a crystal while changing the acoustic frequency.

Information about absolute position of a scanning mirror can be extracted indirectly. For example, as shown in FIG. 18, piezo elements 1800 may be used to produce a force that scans a mirror 1802. By measuring a voltage generated by the piezo elements 1800, the amount of force produced and hence the angular movement of the mirror 1802 may be derived. In the illustrated embodiment, the piezo elements 1800 are mounted on a base 1804, which are subject to forces generated by a hinge 1806. Since the angular deflection of the mirror 1802 is generally proportional to the torque the hinge produces, the voltage from the piezo elements 1800 is also proportional to the deflection. Since the piezo elements 1800 are essentially capacitors, their impedance may be quite high, especially at low frequencies, a signal conditioner 1808 with high input impedance may be useful.

Those skilled in the art will appreciate that in an alternative embodiment of the instant invention, the piezo elements 1800 may be take the form of benders, as shown in FIG. 19.

Position sensors may also be used to detect the position of the scanning mirror. As shown in FIG. 20, a relatively small magnet 2000 may be attached to the mirror 1802, and a stationary coil 2002 can be used to determine the angular velocity of the mirror 1802. That is, the voltage in the coil 2002 is proportional to the velocity for reasonably small scan angles. Since velocity is a derivative of mirror position, position can be determined by integrating the velocity feedback signal. Those skilled in the art will appreciate that the position and movement of the magnet 2000 and the coil 2002 may be reversed without departing from the spirit and scope of the instant invention. That is, the coil 2002 may be on the mirror 1802 while the permanent magnet 2000 is stationary.

Alternatively, a relatively small piece of soft magnetic material, magnetized by external permanent magnets can be used without departing from the spirit and scope of the instant invention.

Turning now to FIG. 21, mirror position can also be determined by measuring the capacitance between an electrode 2100 disposed on the mirror 1802 and a stationary electrode 2102 spaced therefrom. Current from a current source 2104 may be applied and the resulting voltage dropout across a resistor 2106 may be measured as an indication of mirror position. Those skilled in the art will appreciate that if the mirror 1802 itself is conductive, the electrode 2100 may not be necessary.

As shown in FIG. 22, mirror position can also be determined by measuring the amount of light from a light source 2200, reflected by the mirror 1802 towards a photo detector 2202. A particularly advantageous optical arrangement is shown in the top and side views of FIGS. 23A and 23B, where FOVs of both the light source 2200 and the detector 2202 are collimated by a lens 2300. In this case, the detector 2202 sees a sharp light pulse when the mirror 1802 surface is substantially perpendicular to the direction of the collimated light beam coming from the lens 2300.

A variety of lenses 1700 or mirrors 1702, having different tilt angles and optical powers, can be positioned in the FOV of an LPD projector 1704, thus creating multiple images of various size and resolution. For example, a small, hi-res image 1706 far away, and a large, low-res image 1708 close by (FIG. 17) may be produced. The LPD controller has to be aware about positions of optical elements and process image data intended for each image accordingly.

In some applications, it may be useful to use various specially designed screens. For example, the light diffused by a LPD screen can be directed into narrower than 180 deg.

angle with a specially designed screen. A screen can have diffraction or holographic pattern, which insures that light is reflected (front projection) or diffused (rear projection) into a controllable angle (FIG. 24). Alternatively, a screen can consist of an array of refractive lenses 2500 (FIG. 25A) for rear projection, or mirrors 2502 (FIG. 25B) for front projection, which direct the light into a relatively narrow angle.

As shown in FIG. 26, lenses can be combined with prisms to form a structure 2600 that directs the light from all points of the screen into the same direction, independent of the direction the light is coming from. That allows uniform viewing angle to be achieved for an LPD with wide scan angle. A similar idea can also be implemented with mirrors for front projection screen or with diffractive screen.

Typically, Phase-Locked Loop circuits consist of a Voltage-Controlled Oscillator (VCO) 2700, a divider 2702, a phase detector 2704 and an amplifier 2706, and they operate to lock the frequency and phase of the VCO output signal to an external reference signal (FIG. 27A). If a signal with frequency already locked to the frequency of the external reference signal is already present, its phase can be locked by replacing VCO with Voltage-Controlled Delay circuit 2708 (FIG. 27B).

If a resonant mirror is used in the LPD, its scan profile could be other than linear, and in some cases may be sinusoidal. Hence, the beam will move a different distance per every clock tick, as is diagrammatically illustrated in FIG. 28A. To compensate for the nonlinear nature of the mirror movement, a look-up table 2800 (FIG. 28B), which assigns data of one pixel of source image to several clock ticks of LPD output data, depending on current mirror position, can be used.

Since the amount of light delivered by the laser beam to a particular point on the screen is inversely proportional to the speed with which the beam is moving, the power of the laser should also be decreased proportionally. This function may also be accomplished by a look-up table arrangement similar to that shown in FIG. 28B.

FIG. 29A stylistically illustrates a typically electron beam scan path in a conventional CRT. Generally, the electron beam is slowly moved in one direction across the viewing screen and then quickly returned backward. Ordinarily, data is clocked in only on the forward traverse. In the LPD of the instant invention, however, the LPD scans with the same speed in both directions, as depicted by the stylistic representation of the laser beam path shown in FIG. 29B. Hence, data is supplied during both forward and backward scans, but every second line of data has to be reversed since the scan occurs in the reverse direction. This reversing of data is accomplished in one embodiment of the instant invention with a bi-directional shift buffer 2900, as shown in FIG. 29C. Image data is loaded into the shift buffer 2900 in the same order as it is arranged in the source image. For example, left to right. A flip-flop 2902 triggers on every line and thus changes the shift direction of the buffer 2900, thereby accommodating the reversal of data on the reverse scan.

In some embodiments of the instant invention, it may be useful to force the scanning mirror to move with constant speed in one direction, while jumping backward with its own resonant speed (FIG. 30, curve 2), if drive current is adjusted by a closed-loop control. Curve 1 of FIG. 30 shows a normal sinusoidal scan profile for reference.

In the embodiment illustrated in FIG. 31, a mirror 3100 has built-in feedback unit 3102, which is capable of extracting both speed and position information of the mirror 3100. Such feedback may be piezoelectric or other, as described above. At the beginning of each constant speed cycle, a mirror controller 3104 sets a desirable speed, which is compared with speed feedback by an error amplifier 3106. An output terminal of the error amplifier 3106 is connected to a mirror driver 3108, so the output current of the driver 3108 is continuously adjusted to minimize the deviation of mirror speed from the value set by controller 3104.

The controller 3104 also sets an end mirror position, which is compared with speed feedback by a comparator 3110. As soon as the mirror 3100 reaches its end position, the comparator 3110 switches the output signal of the driver 3108 into high-impedance state, so the mirror 3100 swings back under the torque of its hinge. Upon reaching the opposite end point, the comparator 3110 switches the driver 3108 back on, and a new cycle begins.

Alternatively, as shown in FIG. 31B, the driver 3108 may be under full control of the controller 3104, which is processing the feedback signal and adjusting driver 3108 accordingly. In this case, instead of continuously adjusting the driver 3108, the controller 3104 can repeat a pre-defined cycle, while making small changes from cycle to cycle. Optionally, the controller 3104 may be synchronized with Vertical Sync pulses from a host controller.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system's memories or registers or other such information storage, transmission or display devices.

Those skilled in the art will appreciate that the various system layers, routines, or modules illustrated in the various embodiments herein may be executable control units. The control units may include a microprocessor, a microcontroller, a digital signal processor, a processor card (including one or more microprocessors or controllers), or other control or computing devices. The storage devices referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions when executed by the control units cause the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. Consequently, processing circuitry required to implement and use the described system may be implemented in application specific integrated circuits, software-driven processing circuitry, firmware, programmable logic devices, hardware, discrete components or arrangements of the above components as would be understood by one of ordinary skill in the art with the benefit of this disclosure. It is therefore evident that the particular embodiments disclosed above may be altered or modified and all such variations are considered within the scope and spirit of the invention. Accordingly, the protection sought herein is as set forth in the claims below.

We claim:

1. An arrangement for projecting an image on a projection surface comprising:
   a red laser source for generating a red laser beam;
   a blue laser source for generating a blue laser beam;
   a green laser source for generating a green laser beam;
   an acousto-optical modulator (AOM) for converting image data into acoustic signals for modulating one of the laser beams, the AOM including a crystal through which the one laser beam passes, and an acoustic transducer for converting the acoustic signals into acoustic waves in the crystal and operative for deflecting the one modulated laser beam modulated by the image data;
   a controller for controllably energizing the laser sources that generate other of the laser beams to modulate the other laser beams to form modulated other laser beams,
   a combiner for combining the modulated laser beams to form a composite beam;
   a scanner for sweeping the composite beam to form a scan line having pixels arranged along one direction, and for sweeping the scan line along another direction generally orthogonal to the one direction to form a raster pattern of scan lines on the projection surface; and
   the controller being operative to illuminate selected pixels on the scan lines to form the image on the projection surface.

2. The arrangement of claim 1, wherein the scanner includes a pair of scan mirrors oscillatable about respective axes extending along both of the directions.

3. A method of projecting an image on a projection surface, comprising the steps of:
   generating a red laser beam with a red laser source;
   generating a blue laser beam with a blue laser source;
   generating a green laser beam with a green laser source;
   converting image data into acoustic signals by modulating only one of the laser beams, including only passing the one laser beam through a crystal and converting the acoustic signals into acoustic waves in the crystal and deflecting the modulated one laser beam modulated by the image data;
   controllably energizing the light sources that generate other of the laser beams to modulate the other laser beams to form modulated, other laser beams,
   combining the one and other, modulated beams to form a composite beam;
   sweeping the composite beam to form a scan line having pixels arranged along one direction, and sweeping the scan line along another direction generally orthogonal to the one direction to form a raster pattern of scan lines on the projection surface; and
   illuminating selected pixels on the scan lines to form the image on the projection surface.

\* \* \* \* \*